United States Patent Office 3,484,190
Patented Dec. 16, 1969

3,484,190
LIGAND FORMING COMPOSITIONS AND
SEPARATIONS USING THEM
Richard Joseph De Feo, Baton Rouge, and Gerald Albert
Byars, Denham Springs, La., assignors to Esso Research
and Engineering Company, a corporation of Delaware
No Drawing. Filed June 21, 1967, Ser. No. 647,594
Int. Cl. C01b 2/02
U.S. Cl. 23—2
28 Claims

ABSTRACT OF THE DISCLOSURE

Monoolefins (complexible ligands) are recovered from olefin containing feed streams by selective complexation of the ligand with a sorbent material comprising an admixture of a Group IB monovalent metal halide and a tin, titanium, or antimony halide or halide derivative, the admixture being slurried in a hydrocarbon diluent in which the feed stream is contacted with the sorbent material; the sorbent material may be preconditioned to increase its capacity for complexing ligands; the recovered monoolefin (ligand) may be used as a monomer in polymerization processes or as a chemical intermediate.

FIELD OF THE INVENTION

This invention relates to an improved process for recovering a complexible ligand, i.e., $C_2$–$C_8$ monoolefins, from feed streams containing such ligands and novel compositions therefor. More particularly, this invention relates to a process for the selective complexation, and recovery, of monoolefins by contacting a monoolefin containing feed stream with a novel sorbent material comprised of an intimate admixture of metal salts represented by the generic formula MX—M'$X_z$R wherein M is a monovalent Group IB metal, X is a halide, M' is tin, titanium, or antimony, R is a monovalent anion selected from the group consisting of X and $C_1$–$C_8$ alkyl groups, and $z$ is an integer from 2 to 3 depending upon the valence of M', the sorbent material being slurried in a hydrocarbon diluent. The MX salt is now referred to as the sorbent salt and the M'$X_z$R salt is referred to as the promoter salt. In a preferred embodiment of this invention, the MX sorbent salt is preconditioned to impart a high degree of porosity thereto, i.e., above about 10% (of the total volume of a particle) 550 to 10,000 A. pores, thereby increasing the complexing capacity of the salt.

DESCRIPTION OF THE PRIOR ART

It is well known that Group IB monovalent metal salts, e.g., cuprous halides, can be employed as sorbents for complexing monoolefins, e.g., ethylene, from monoolefin containing feed streams. Thus, for example, solid cuprous halides have been found useful in complexing and recovering propylene from propylene-propane feed streams and ethylene from ethylene-hydrogen feed streams as reported in U.S. Patent No. 2,289,773. Additionally, the use of a cuprous halid sorbent as a slurry in kerosene has also been found useful in selectively complexing ethylene and propylene from their respective paraffin mixtures, as reported in U.S. Patent No. 2,209,542.

While the cuprous halide sorbent salts have been successfully employed to recover monoolefins, their use has not been without difficulty and serious economic disadvantages. Thus, when employing cuprous halide salts as sorbents, relatively low temperatures or high pressures or a combination thereof are required in order to obtain good yields of a high purity olefin. These conditions are necessitated by the fact that cuprous chloride-ethylene complexes, for example, have relatively high dissociation pressures and, therefore, do not permit the formation of stable complexes at or near ambient conditions of temperature and pressure. As an illustration, cuprous chloride-ethylene complexes start to form, under atmospheric pressure, at 16° F. Nevertheless, in order to recover appreciable yields of a high purity ethylene, much lower temperatures and/or higher pressures are required since the capacity of the salt at this temperature is quite low. Consequently, when 95 wt. percent yields of ethylene are desired, it is not unusual, when employing cuprous halides alone, to contact the ethylene containing stream at (complexing) temperatures of about —20 to —40° F. and/or pressures ranging up to about 300 p.s.i. and higher. It is apparent that the economics of such a recovery system will be severely burdened by refrigeration costs and/or costs for the considerable compression facilities that must be employed. Thus, while the art has generally adopted refrigeration techniques for effecting ethylene recovery, this technique is quite costly, i.e., about 70% of the total cost for recovering ethylene using a cuprous chloride salt, per se, is attributable to refrigeration (and similarly for propylene recovery). Nevertheless, it has now been found that lower olefins may be complexed at or near room temperatures and pressures without sacrificing either yield or purity of the recovered product by employing a promoting material in admixture with the known sorbent. Thus, it is now possible to obtain 95+ wt. percent yields of ethylene or propylene with a purity of 95+ wt. percent by the practice of this invention.

SUMMARY OF THE INVENTION

In accordance with this invention, therefore, complexible ligands, i.e., $C_2$–$C_8$ monoolefins may be recovered by contacting a ligand containing feed stream with a novel sorbent material comprised of an intimate admixture of metal salts represented by the generic formula MX—M'$X_z$R, wherein M, X, M', $z$, and R are as previously described, the sorbent being slurried in a hydrocarbon diluent, whereby the complexible ligand is preferentially complexed with sorbent and separated from the feed stream. The complexing can be conducted at temperatures ranging from about 0° to 150° F., and pressures ranging from about 0 to 200 p.s.i.g. Thus, it is readily apparent that the novel process described herein can be effected without the high costs attendant to the prior art processes. In a preferred embodiment of this invention, the MX salt is provided with a preconditioning treatment to increase the complexing capacity of the salt by providing a porosity of at least about 10% (of the total volume of a particle) 550 to 10,000 A.

The instant invention may be successfully employed to recover such complexible ligands as $C_2$–$C_8$, preferably $C_2$–$C_4$ monoolefins, e.g., ethylene, propylene, butene, pentene, etc. Ethylene and propylene, however, are particularly desirable ligands for which the instant process provides an excellent means of recovery. These ligands may be recovered from streams wherein the ligand is present in a mixture with its corresponding saturate, e.g., ethylene-ethane streams. Further, the desired ligands will be preferentially complexed from feed streams containing hydrogen, nitrogen, and methane, or other materials inert to the sorbent composition, in addition to the corresponding saturates. Additionally, it is possible to preferentially segregate ethylene and propylene from combined $C_2$ and $C_3$ streams. Such feed streams are normally produced from the steam cracking of naphthas and middle distillates.

The novel sorbents of the present invention comprise an admixture of two metal salts. One salt, the sorbent salt, may be represented by the formula MX and the other salt, the promoter salt, by the formula $M'X_zR$. In the former, M is a monovalent Group IB metal, i.e., silver, gold, copper, of which copper is most particularly preferred. Silver and gold, although relatively expensive, nevertheless form similar types of salts as copper, e.g., silver fluoborate, which can be used to complex complexible ligands, X is a halide, i.e., fluorine, chlorine, bromine, iodine, of which chlorine and bromine are preferred and chlorine is particularly preferred. The most preferred MX salt, then, is a cuprous halide, specifically cuprous chloride. In the latter salt, M' is a metal selected from the group consisting of tin, titanium, and antimony, of which tin is preferred. (It is noted that not all the configurations of these metals are capable of promoting the MX salt. Thus, the stannic and not the stannous salt is effective. Similarly, pentavalent antimony is not effective and divalent titanium is also not believed to be effective, while trivalent antimony and tetravalent titanium are effective promoters.) In the $M'X_zR$ salt, R is a monovalent anion selected from the group consisting of X and $C_1$–$C_8$ alkyl radicals, and z is an integer from 2 to 3, depending upon the valence of M'. X in the promoting salt may be the same or different as X in the sorbent salt, but is preferably the same. Typical examples of promoting salts that may be employed are titanium tetrachloride, stannic halides, antimony trichloride, $SnCl_3R$ wherein R is an ethyl, propyl, butyl, pentyl, etc. radical, and the like. The most preferred sorbent mixtures are cuprous chloride-$SnCl_3R$ mixtures wherein R is chlorine, ethyl, or propyl.

The $M'X_zR$ salts are referred to as promoter salts because these salts alone do not complex with the complexible ligands which are the desired products of this invention. Nevertheless, these salts markedly enhance the ability of the MX salt to complex with the desired ligands. While not wishing to be bound by a particular theory, it is believed that the $M'X_zR$ promoter salt assists in stabilizing the ethylene or propylene, etc., complexes with the MX sorbent by a cross-linking mechanism. Additionally, such related salts as zinc chloride, silicon tetrachloride, arsenic trichloride, lead chloride, calcium chloride, ferric chloride, chromic chloride, cobaltous chloride, and bismuth trichloride were found to be ineffective as promoters even when used in molar amounts of less than one with the sorbent salt.

The novel sorbent mixtures employed in this invention can be readily prepared by a variety of procedures. One satisfactory method is to slurry the sorbent salt, MX, and the promoter salt, $M'X_zR$, in an inert hydrocarbon diluent, e.g., $C_5$–$C_{12}$ paraffins, pentane, hexane, heptane, octane, etc. The sorbent composition generally will contain less than one mole of promoter salt per mole of sorbent salt in order to obtain maximum capacity and highest sorbent efficiency. Normally, the molar concentration of promoter salt will range from about 0.005 to about 1.0 mole per mole of sorbent salt, preferably about 0.1 to about 0.75 mole per mole, and more preferably about 0.2 to 0.6 moles of promoter salt per mole of sorbent salt. The intimate admixture of salts readily forms at about ambient temperatures, e.g., 60° to 90° F., but slight heating to hasten the formation may be used without deleterious effect, e.g., up to about 165° F. The components are usually stirred or agitated in some manner so that each can intimately associate with the other by simple physical mixing. The slurry prepared in this manner can be used for contacting the ligand containing feed stream with the novel sorbent composition.

As mentioned, above, the hydrocarbon diluent is preferably a $C_5$–$C_{12}$ paraffin. However, $C_6$–$C_{20}$ monocyclic aromatic hydrocarbons are also useful, particularly $C_6$–$C_{12}$ monocyclic aromatic hydrocarbons, e.g. benzene, toluene, xylene, durene, etc. As one preferred embodiment, a liquid monoolefin can be employed in the slurry liquid to enhance the activity of the sorbent salt and increase the rate of complexation. Generally, monoolefins having the same approximate boiling range as the diluent, e.g., $C_5$–$C_{12}$ monoolefins (n-decane boils at about 347° F. and 1-decene boils at about 340° F.) may be used in amounts of at least about 3 wt. percent based on total diluent. However, the monoolefin employed should be of a higher molecular weight than the monoolefin to be recovered, e.g., when recovering ethylene, 1-hexene may be used as a promoter, thereby avoiding any interference with the selective complexation. Because Group IB metal halides, e.g., cuprous halide, are generally susceptible to hydrolysis, the diluent is most preferably anhydrous, although small amounts of water, e.g., up about 1.0 wt. percent, preferably 0.5 wt. percent, based on sorbent salt, may be tolerated.

As mentioned previously, the complexation may be effected at temperatures ranging from about 0° to 150° F. However, ethylene and propylene can generally be readily recovered at temperatures ranging from about 20° to 50° F. under atmospheric pressure. Normally, it is desirable to employ simple cooling water as a refrigeration means (thereby further reducing operating costs) which necessitates somewhat higher than atmospheric pressure, e.g., 70 to 120 p.s.i.g. Thus, as a general rule, higher operating pressures will allow higher operating temperatures, and the most convenient facilities available are normally employed.

The complexed ligand is easily recovered by decomplexing (desorbing) the ligand-sorbent material complex. Decomplexing is accomplished at a higher temperature than for complexing and ranges from about 60° to 240° F. It is sometimes desirable to heat the complex at temperatures ranging from about 30° to 150° F., but higher than for complexing, in order to strip nonpreferentially sorbed materials, such as ethane or higher olefins, e.g., monoolefin activators, when ethylene is the desired ligand. Pressures during the decomplexing or stripping stages can range from 0 to 200 p.s.i.g. but are not critical. Since the stability of the complex is a function of temperature and pressure, it will be clear to those skilled in the art that decomplexing and/or stripping may also be accomplished by lowering the pressure, while maintaining constant temperatures. Nevertheless, varying the temperature will generally be the easiest method for decomplexing and/or stripping.

PREFERRED EMBODIMENT

While the sorbent salt may be used as is in the novel compositions of this invention, it will have a relatively low capacity for complexing ligands during initial runs. Only after several runs will the capacity of the sorbent salt begin to build up to a maximum. Thus, while the sorbent salt, per se, may be conditioned in actual use, it is generally preferred to utilize a highly sorbent-active, porous, sorbent salt at the outset.

The preparation of the sorption-active porous, particulate, solid sorbent salt particles is readily conducted in accordance with the procedures set forth in U.S. patent application Ser. No. 333,925 filed by Robert B. Long and Warren A. Knarr on Dec. 27, 1963, and Ser. No. 333,926 filed by Robert B. Long also on Dec. 27, 1963, both now abandoned, and the disclosures of both of said applications are incorporated herein by reference.

In general, the preparation of sorption-active sorbent salts having the requisite porosity of above about 10% (of the total volume of a particle) being 550 to 10,000 A. pores can be conducted conveniently in accordance with the following exemplary procedure. For example, a dried cuprous halide salt can be dissolved in a wide variety of solvent, including both organic and inorganic solvents, as will be noted from Ser. No. 333,925 and Ser. No. 333,926 referred to hereinabove. Among the organic solvents that can be used to dissolve the cuprous halide salt are $C_4$–$C_{10}$ monoolefins; refinery hydrocarbon streams containing a predominant portion of $C_4$–$C_{10}$ monoolefins, including Types I, II, III, IV, and cyclic olefins, e.g., light fractions from steamed cracked naphthas; refinery hydrocarbon streams containing a predominant portion of monocyclic aromatic hydrocarbons, e.g., hydrocarbon raffinate streams, etc. Typically, a solvent is used in which the cuprous halide complexes are insoluble. Suitable exemplary $C_4$–$C_{10}$ monoolefinic solvents include, but are not limited to, the following: butene-1, isobutylene, pentene-1, hexene-1, heptene-1, octene-1, nonene-1, decene-1, and mixtures of any two or more of the above monoolefins with or without such optional hydrocarbon diluents as paraffins, cycloparaffins, multiolefins, etc. The cuprous halide salt is gradually added to a suitable solvent, and the solution is stirred. Usually, this dissolving step is conducted at temperatures ranging from about —40 to about 80° F., and more preferably ranging from about —10 to about 40° F.

After the formation of the cuprous halide solution in the manner indicated, the solution is usually treated to separate and thereby remove insoluble and undissolved materials therefrom, e.g., undissolved cuprous halide salt, insoluble residues, etc. This separation treatment can be conducted by filtration, centrifugation, decantation, etc. Preferably, the cuprous halide solution is filtered to remove insolubles by precoating the filter with insolubles from previous runs. The clarified cuprous halide solution is then contacted with a suitable conditioning complexing agent capable for forming a stable copper complex having a mole ratio of copper to complexing agent of greater than 1:1. Upon dissociation of this complex, the active cuprous halide sorbent having the requisite porosity for use in accordance with this invention is obtained. Suitable complexing agents which can be used for this purpose include both materials which form only complexes having the ratio of copper to complexing compound greater than 1:1 and compounds which form complexes having a ratio of 1:1 or less, which upon decomplexing (desorption) pass through a stable complex having a ratio of copper to complexing compound greater than 1:1. Thus, certain materials, e.g., nitriles, diolefins, acetylenes, carbon monoxide, etc., which under ordinary conditions form a 2:1 complex can be made to complex in ratios of copper to complexing compound of 1:1 or less. However, upon dissociation, complexing material is released selectively from the bed of cuprous halide until the stable complex, i.e., the complex having a copper to complexing agent ratio above 1:1, e.g., the 2:1 stoichiometric complex, is completely formed before further decomplexing to the uncomplexed (active) cuprous halide occurs. In this procedure, a "stable complex" means a stoichiometric complex stable upon dissociation as described in the preceding sentence. Such complexing agents (conditioning ligands) as contemplated herein include, but are not limited to, the following: carbon monoxide; organic nitriles, organic compounds having an acetylenic group, i.e., as present in acetylene; $C_3$–$C_{20}$ polyolefins, e.g., allene, and especially $C_4$–$C_{10}$ conjugated diolefins, e.g., butadiene, isoprene; etc. More than one of these functional groups can be present in a single molecule of the complexing compound. In addition, the complexing agent can contain other functional groups so long as they do not interfere with complex formation. A more comprehensive discussion of suitable complexing agents capable of use in preparing the sorption-active cuprous halide sorbents which are employed in accordance with this invention can be found in Ser. No. 333,925 and Ser. No. 333,926 referred to hereinabove.

The selected suitable conditioning complexing agent, preferably butadiene, is contacted with the clarified cuprous halide solution at temperatures ranging from about —40 to about 100° F., preferably —10 to 80° F., for a sufficient period of time to precipitate out substantially all of the cuprous halide salt as an insoluble cuprous halide-butadiene complex. Mild agitation is usually empoyed, e.g., stirring, to insure adequate uniform contact of the dissolved salts and the butadiene. Preferably, a solvent is employed to dissolve the solid cuprous salt, the cuprous halide conditioning ligand complex being insoluble in the solvent. The cuprous halide conditioning ligand complex then precipitates and can be readily separated from the solvent. The conditioning ligand can be supplied to the cuprous halide solution in gaseous or liquid form, and it can be present as a comparatively pure ligand, or it can be diluted with nitrogen, paraffins, or other inert gases. Any suitable separation procedure can be employed, e.g., filtration, centrifugation, settling, etc., to recover the insoluble cuprous halide conditioning ligand complex from the solvent.

Following recovery of the cuprous halide conditioning ligand complex, the complex is dissociated, e.g., by thermal decomplexation, to produce directly the activated cuprous halide sorbent particles by subjecting the complex particles to conditions of temperature and pressure such that the dissociation pressure of the conditioning complex exceeds the partial pressure of the complexed conditioning ligand. Consequently, the complex decomposes with release of the conditioning ligand which can be recovered by conventional recovery procedures. Drying (optional) and complexing are usually accomplished in the following manner: the complex, as a wet cake from filtration or other separation, is collected in a suitable vessel, stripping gas is then admitted to the bottom of the vessel and heat is applied to the vessel and/or stripping gas, which promotes drying of the complex. As the free liquid solvent is removed, the granular complex loses its cake form and the discrete particles readily fluidize. Decomplexing to form the active cuprous halide sorbent is then accomplished by heating at temperatures of about 100 to 220° F. and pressures ranging from about 1.5 to 150 p.s.i.a., and usually at temperatures of about 140 to 190° F. and pressures of about 10 to 75 p.s.i.a. Typical thermal decomplexation conditions which can be used for this purpose are 0.3 ft./sec. superficial vessel stripping gas velocity and 170 to 190° F. vessel temperature at atmospheric pressure.

The activated cuprous halide sorbent particles thus prepared are porous and have a characteristic porosity above about 10% (of the total volume of a particle) 550 to 10,000 A. pores, as determined by mercury porosimeter measurements. The density of these active sorbent particles characteristically ranges from about 60 to about 90 lbs./cu. ft. (loose) and about 65 to about 97 lbs./cu. ft. (compacted). The average particle size diameter of said active cuprous halide sorbent particles characteristically ranges from about 50 to 125+ microns.

The term "capacity" as used herein refers to the maximum loading (complex formation) obtainable as is expressed as a percent of the theoretical. The term "activity" is employed herein to denote the rate at which the capacity is achieved.

This invention will now be further illustrated by the following examples. Modifications and variations will be obvious to those skilled in the art and, therefore, no limitations, other than in the claims appended thereto, should be inferred.

In all of the following examples, commercially available cuprous halide salts can be used, that is, the purity of the salt should be at least about 75%, preferably, however, the purity should be 85 to 100%, and more preferably at least 99%.

Example 1

A mixture of cuprous chloride having a porosity of greater than 10% pore with diameters between 550 and 10,000 A. and 0.25 mole of stannic chloride per mole of cuprous chloride was slurried in heptane. The slurry was treated with ethylene at 20° F., and picked up approximately 0.5 cu. ft. of ethylene in 15 minutes. This represents about 30% capacity for the porous cuprous chloride based on one mole of ethylene per mole of cuprous chloride. The temperature was then raised to 90° F., and 0.5 cu. ft. of ethylene (desorbed from the cuprous chloride)

was given off. The slurry was cooled and the cycle was repeated several times, showing that the capacity of the slurry for ethylene recovery did not diminish on cycling. Similar tests were conducted at the same conditions with porous cuprous chloride alone and with stannic chloride and 95° F. Pure ethylene and propylene were employed as feed, ethylene for complexing-decomplexing cycles 1–13 and propylene in cycles 14–16. In several runs hexene was used as an activator in the slurry diluent. The pertinent data are noted below in Table I.

TABLE I

[$SnCl_4$ modified $CuCl$]

| Cycle No. | CuCl, g. | $SnCl_4$, g. | Mole ratio $SnCl_4/CuCl$ | $C_7$, g. | $C_6^=$, g. | Feed | Approx. Compl. Temp., ° F. | Approx. Dec. Temp., ° F. | Cap. percent [3] |
|---|---|---|---|---|---|---|---|---|---|
| 1 | 200 | 70 | 0.13 | 400 | 0 | Pure $C_2^=$ | 20 | 90 | 32.5 |
| 2 | 200 | 70 | 0.13 | 400 | 0 | $C_2^=$ | 22 | 90 | 28 |
| 3 | 200 | 90 | 0.17 | 400 | 0 | $C_2^=$ | 23 | 90 | 40.5 |
| 4 | 200 | 110 | 0.21 | 400 | 0 | $C_2^=$ | 20 | 95 | 31.5 |
| 5 | 200 | 110 | 0.21 | 400 | 0 | $C_2^=$ | 20 | 95 | 31.5 |
| 6 | 200 | 110 | 0.21 | 400 | 8 | $C_2^=$ | 20 | 95 | 36 |
| 7 | 200 | 110 | 0.21 | 400 | 8 | $C_2^=$ | 20 | 95 | 47 |
| 8 | 200 | 110 | 0.21 | 400 | 8 | $C_2^=$ | 20 | 95 | 44 |
| 9 | 200 | 138 | 0.26 | 400 | 8 | $C_2^=$ | 20 | 95 | 37 |
| 10 | 200 | 138 | 0.26 | 400 | 8 | $C_2^=$ | 20 | 95 | 35.5 |
| 11 | 200 | 138 | 0.26 | 400 | 16 | $C_2^=$ | 20 | 95 | 39 |
| 12 | 200 | 138 | 0.26 | 400 | 16 | $C_2^=$ | 20 | 95 | 42 |
| 13 | 200 | 138 | 0.26 | 400 | 16 | $C_2^=$ [1] | 30 | [2] 95 | 36 |
| 14 | 200 | 138 | 0.26 | 400 | 16 | Pure $C_3^=$ | 25 | 95 | 35 |
| 15 | 200 | 138 | 0.26 | 400 | 16 | $C_3^=$ | 25 | 95 | 44 |
| 16 | 200 | 138 | 0.26 | 400 | 16 | $C_3^=$ | 20 | 95 | 45.5 |

[1] Pressure 36 p.s.i.g.  [2] Pressure 0 p.s.i.g.  [3] Capacity based upon a theoretical mole ratio of one mole of olefin to one mole of cuprous chloride.

alone. In neither instance was any uptake of ethylene obtained with the slurry at 20° F. and atmospheric pressure.

In these and other tests given in the following examples, the monoolefin being adsorbed is removed from the feed stream almost entirely until the capacity of the slurry sorbent mixture is reached. At this point, breakthrough of monoolefin at feed concentration takes place. The actual amount of monoolefin which is not adsorbed depends on the dissociation pressure of the complex at the complexation temperature, and is somewhat different for each olefin and each slurry sorbent mixture.

Example 2

A mixture of porous cuprous chloride having a porosity as defined above in Example 1 and 0.13 mole (based on cuprous chloride) of titanium tetrachloride were slurried in normal heptane at 70° F. Ethylene was added at 15° F. and complexed with the sorbent material. Desorption was then conducted by heating the complex particles at temperatures between 50 and 100° F. for 15 to 60 minutes. The amount of ethylene recovered was comparable to an 18% capacity based on the copper content of the sorbent mixture. Again, titanium tetrachloride alone, when slurried in n-heptane, gave no absorption of ethylene at 15° F. and atmospheric pressure.

Example 3

The following 16 cycles of complexing and decomplexing were performed using cuprous chloride-stannic tetrachloride sorbent mixture containing varying amounts of the components as noted in Table I, below. The cuprous chloride material was an active, highly porous cuprous chloride sorbent having a porosity of at least 10% pores of diameter between 550 and 10,000 A. The stannic tetrachloride was approximately 95% pure. The inert slurry diluent was normal heptane liquid and the complexing and decomplexing reactors were glass. The complexing was conducted at temperatures of 20 to about 25° F. and decomplexing was conducted at temperatures between 90

As will be noted from the data in Table I, the sorptive capacity of the adsorbent mixture is enhanced by employing a monoolefin activator. Another observation in conjunction with the data of Table I is that cycle 13 shows that higher complexation temperatures can be used if higher complexation pressures are employed.

Example 4

Related studies were conducted over six cycles and a control cycle (where the porous cuprous chloride, per se, was employed and wherein the complexing was conducted at temperature of from 14 to 25° F. with decomplexing again attempted at between 90 and 95° F. The results of these studies are tabulated below in Table II.

TABLE II

[Effect of $SnCl_4$ concentration]

| Test | CuCl, g. | $SnCl_4$, g. | Mole ratio $SnCl_4/CuCl$ | Heptane, g. | Feed | Approx. Compl. Temp., ° F. | Approx. Dec. Temp., ° F. | Capacity, Percent |
|---|---|---|---|---|---|---|---|---|
| 0 | 200 | 0 | 0 | 400 | $C_2^=$ | 20 | 90 | 0 |
| 1 | 200 | 110 | 0.21 | 400 | $C_2^=$ | 20 | 90 | 33 |
| 2 | 200 | 210 | 0.40 | 400 | $C_2^=$ | 20 | 90 | 32 |
| 3 | 200 | 319 | 0.61 | 400 | $C_2^=$ | 20 | 90 | 32 |
| 4 | 200 | 20 | 0.04 | 400 | $C_2^=$ | 14 | 90 | 12 |
| 5 | 200 | 70 | 0.13 | 400 | $C_2^=$ | 25 | 95 | 35 |
| 6 | 200 | 120 | 0.23 | 400 | $C_2^=$ | 20 | 95 | 33 |

As will be noted from Table II, the porous cuprous chloride sorbent, per se, is incapable of effectively complexing with the ethylene feed stream at temperatures of 20° F. Table II also shows that no advantage in sorptive capacity is obtained by employing large amounts of $M'X_zR$ material, in this case stannic tetrachloride. On the other hand, it appears that each of the three $M'X_zR$ metals has its optimum mole ratio with the MX salt, especially in the case of cuprous chloride. Thus, it will be noted that in Test 4 where 20 g. of stannic tetrachloride was mixed with 200 g. of porous cuprous chloride, the sorptive capacity was reduced to 12%, which is, of course, less than desired. For the mixture CuCl, $SnCl_4$, the optimum ratio appears to be about 0.2 mole $SnCl_4$ per mole of CuCl. Excess $SnCl_4$ would not normally be employed as it would add to the expense of the process.

Example 5

Using essentially the same slurry recovery technique as employed above in Example 1, six cycles lasting approximately one hour each of complexing (15 to 30 minutes) and decomplexing (15 to 30 minutes) were conducted on a pure ethylene gaseous feed stream using sorbent mixtures of cuprous chloride, having the porosity defined in Example 1, and titanium tetrachloride of a purity of 95+%. The inert paraffin diluent was normal heptane, complexing was conducted at temperatures between 20 and 25° F., and decomplexing between 60 and 80° F. The capacity results and other pertinent data are summarized below in Table III.

TABLE III
[CuCl-TiCl₄ sorbent]

| Cycle No. | CuCl, g. | TiCl₄, g. | Mole ratio TiCl₄/CuCl | C₇, g. | Feed | Approx. Complexing Temp., °F. | Approx. Decomplexing Temp., °F. | Capacity Percent |
|---|---|---|---|---|---|---|---|---|
| 1 | 200 | 50 | 0.13 | 400 | $C_2^=$ | 20 | 60 | 18 |
| 2 | 200 | 50 | 0.13 | 400 | $C_2^=$ | 20 | 60 | N.D. |
| 3 | 200 | 92 | 0.24 | 400 | $C_2^=$ | 20 | 65 | 32 |
| 4 | 200 | 159 | 0.42 | 400 | $C_2^=$ | 25 | 80 | 54 |
| 5 | 200 | 227 | 0.60 | 400 | $C_2^=$ | 25 | 80 | 63 |
| 6 | 200 | 227 | 0.60 | 400 | $C_2^=$ | 25 | 80 | 57 |

N.D.—Not determined.

For mixtures of TiCl₄ and CuCl, a mole ratio of 0.6 TiCl₄ to 1.0 CuCl appears to be optimum.

Example 6

A similar test was carried out using a mixture of porous cuprous chloride and antimony trichloride in the ratio of 0.22 mole of SbCl₃ per mole of CuCl. Complexation was carried out at 15° F., and decomplexation at 70° F. and atmospheric pressure. A capacity of 27% of theoretical of one mole of ethylene per mole of CuCl was obtained. Again, SbCl₃ alone, slurried in heptane, failed to absorb any ethylene at the above conditions.

A series of runs were conducted in accordance with the overall procedure of Example 1, above, using active, highly porous cuprous chloride mixed with stannic tetrachloride having a purity of 95+%; the mixture contained 19 mole percent of stannic tetrachloride based on cuprous chloride. The cuprous chloride-stannic tetrachloride sorbent mixture was employed to recover ethylene and propylene from different feed streams as noted in Table IV, below. The complexing was conducted at temperatures of 20° to about 100° F. with decomplexing taking place at temperatures of 95 to 110° F. It will also be noted that the pressure went as high as 106 p.s.i.g. as will be noted for Run C. It will also be noted that the purity of the ethylene recovered in the procedure of Run B is 96.7%, which is excellent considering the low concentration at which it was present in the feed stream. Additionally, it will be observed that the use of higher pressures during complexing enhances the capacity of the sorbent material to complex with the ethylene. An interesting facet of the present invention is that the process can be empolyed to recover both ethylene and propylene at the same time for a feed containing both olefins. Once the ethylene-propylene mixture is separated, it is not difficult to distill one from the other. It will be noticed that Run D produces excellent purity ethylene and propylene and demonstrates excellent recovery thereof. The test results are summarized here below in Table IV.

TABLE IV
[CuCl-SnCl₄ Data on different feeds]

| Run No. | Cycle | CuCl, g. | SnCl₄, g. | Mole ratio SnCl₄/CuCl | C₇, g. | Feed | Approx. complexing temp., °F. | Approx. decomplexing temp., °F. | Capacity, percent |
|---|---|---|---|---|---|---|---|---|---|
| (A) | 1 | 200 | 100 | 0.19 | 300 | Pure $C_2^=$ | 20-25 | 95 | 35. |
| | 2 | 200 | 100 | 0.19 | 300 | Pure $C_2^=$ | 20-25 | 95 | 34. |
| (B) | Dilute feed and purity data | | | | | | | | |
| | 1 | 200 | 100 | 0.19 | 300 | Dilute $C_2^=$ (11% H₂, 39% CH₄, 10% C₂H₆, 40% C₂H₄). | 25 | 95 | 21 (96.7% $C_2^=$ Purity). |
| (C) | Effect of pressure | | | | | | | | |
| | 1 | 200 | 100 | 0.19 | 300 | Dilute $C_2^=$ (61% $C_2^=$, 39% N₂). | ¹ 100 | ² 110 | 41. |
| (D) | Complexing $C_2^=$+$C_3^=$ at same time | | | | | | | | |
| | 1 | 200 | 100 | 0.19 | 300 | Dilute $C_2^=$, $C_3^=$ (43% N₂, 46% $C_2^=$, 11% $C_3^=$). | 25 | 95 | 45 (C₂ and C₃ combined); product 83% $C_2^=$, 17% $C_3^=$. |
| (E) | Complexing $C_2^=$ and $C_3^=$ from dilute feed | | | | | | | | |
| | 1 | 200 | 100 | 0.19 | 300 | Dilute $C_2^=$, $C_3^=$ (6% H₂, 21% CH₄, 5% C₂H₆, 20% C₂H₄, 30% C₃H₆, 18% C₃H₈). | 25 | 95 | 42 (C₂ and C₃ combined); product 41.3% $C_2^=$, 0.7% C₂, 57.4% $C_3^=$, 0.6% C₃. |

¹ 106 p.s.i.g.   ² Atmos. Pres.

Run C again shows that higher complexing temperatures can be employed if higher pressures are used.

In a broader embodiment of this invention, the novel sorbent compositions disclosed herein may be employed to complex ligands other than the monoolefins already described. Thus, under the conditions previously set forth, carbon monoxide may be complexed and separated from CO containing streams. For example, carbon monoxide may be separated from a synthesis gas stream in order to produce high purity hydrogen. Additionally, in some high temperature coking operations or steam cracking operations it is sometimes desirable to remove CO from the product stream, e.g., from an ethylene stream from steam cracking, by proper adjustment of operating conditions, CO may be preferentially complexed. By similar adjustments in the operating conditions acetylenic impurities may be preferentially removed from C₂-C₆ steam cracking product streams, e.g., vinyl acetylene from a C₄ stream. Additionally, dienes, e.g., butadiene, isoprene, etc., can be preferentially removed from their corresponding monoolefins, e.g., butenes and pentenes; also, nitrile ligands, such as are produced by the ammoxidation of propylene, may be separated, e.g., acetonitrile from acrylonitrile. Generally, ligands such as dienes, acetylenes, CO, and nitriles form relatively stable complexes with the sorbent compositions. However, it would be desirable to operate at temperatures somewhat lower than for the complexing of monoolefins. The optimum conditions, i.e., temperature and pressure, for complexing any particular ligand will be easily determined by those skilled in the art. Further, the time for complexing is not critical, for any particular ligand, and normally the complexing reaction is continued for a sufficient period of time to allow the sorbent composition to complex with the ligand in an amount substantially approaching the capacity of the sorbent composition.

What is claimed is:

1. A process for recovering complexible ligands selected from the group consisting of monoolefins, dienes, acetylenes and carbon monoxide from ligand containing feed streams which comprises contacting the feed stream with a solid sorbent material consisting essentially of an admixture of metal salts represented by the formula MX and $M'X_zR$ wherein M is a monovalent Group IB metal, X is a halogen, M' is selected from the group consisting of tin, titanium, and antimony, R is selected from the group consisting of $C_1$–$C_8$ alkyl radicals and X, and $z$ is an integer from 2 to 3, thereby preferentially complexing the ligand from the feed stream, and thereafter subjecting said complex to temperature and pressure conditions sufficient to decomplex and recover said ligands.

2. The process of claim 1 wherein the feed stream is contacted with the sorbent material at temperatures of about 0–150° F. and pressures of about 0–200 p.s.i.g.

3. The process of claim 1 wherein the sorbent material is slurried in an inert hydrocarbon diluent.

4. The proces of claim 1 wherein the ligand preferentially recovered is ethylene.

5. The process of claim 1 wherein the ligand preferentially recovered is propylene.

6. The process of claim 1 wherein M is copper.

7. The process of claim 1 wherein the $M'X_zR$ salt is present in molar amounts of 0.005–1.0 mole per mole of MX salt.

8. The process of claim 1 wherein the ligand is recovered from the sorbent material by desorbing the olefin-sorbent material complex at temperatures greater than that used to form the complex and in the range of about 60–240° F.

9. The process of claim 8 wherein the ligand-sorbent material complex is stripped at temperatures greater than that used to form the complex and in the range of about 30–150° F., and prior to desorbing.

10. A process for recovering complexible ligands selected from the group consisting of ethylene, propylene, and mixtures thereof from ligand containing feed streams which comprises contacting the feed stream with a solid sorbent material consisting essentially of an admixture of metal salts represented by the formulae MX and $M'X_zR$ wherein M is a Group IB monovalent metal, X is a halogen, M' is selected from the group consisting of tin, titanium, and antimony, R is selected from the group consisting of $C_1$–$C_8$ alkyl radicals and X, and $z$ is an integer from 2 to 3, the $M'X_zR$ salt being present in molar amounts of about 0.005–1.0 mole per mole of MX salt, the solid sorbent material being slurried in an inert hydrocarbon diluent, thereby preferentially complexing the ligand at temperatures of about 0–150° F. and pressures of about 0–200 p.s.i.g.

11. The proces of claim 10 wherein M is copper.

12. The process of claim 11 wherein X is chlorine.

13. The process of claim 11 wherein the inert diluent is a $C_5$–$C_{12}$ paraffin.

14. The process of claim 11 wherein the inert diluent additionally contains a monoolefinic component.

15. The process of claim 14 wherein the monoolefinic component contains a similar number of carbon atoms as the inert diluent.

16. The process of claim 11 wherein $M'X_zR$ salt is present in molar amounts of about 0.1–0.75 mole per mole of MX salt.

17. The process of claim 11 wherein the $M'X_zR$ is stannic tetrachloride.

18. The process of claim 17 wherein M' is antimony.

19. The process of claim 17 wherein M' is titanium.

20. The process of claim 11 wherein R is chlorine.

21. The process of claim 11 wherein the MX salt is preconditioned to have a porosity of about 10% (of the total volume of a particle) 550 to 10,000 A. pores.

22. A sorbent material composition consisting essentially of an admixture of metal salts represented by the formulae MX and $M'X_zR$ wherein M is a nonvalent Group IB metal, X is a halogen, M' is selected from the group consisting of tin, titanium, and antimony, R is selected from the group consisting of $C_1$–$C_8$ alkyl radicals and X, and $z$ is an integer from 2–3, and the MX salt is one having a porosity of at least about 10 percent (of the total volume of the particle) 550 to 10,000 A. pores.

23. The composition of claim 22 wherein M is copper.

24. The composition of claim 22 wherein X is chlorine.

25. The composition of claim 22 wherein M' is tin.

26. The composition of claim 22 wherein M' is titanium.

27. The composition of claim 22 wherein M' is antimony.

28. The composition of claim 22 wherein R is chlorine.

References Cited

UNITED STATES PATENTS 2,399,488   4/1946   Hearne _____ 252—441
3,243,471   3/1966   Stern.

HERBERT LEVINE, Primary Examiner

U.S. Cl. X.R.

252—429, 441; 260—677, 679, 681.5